(12) United States Patent
Noguchi et al.

(10) Patent No.: US 11,454,864 B2
(45) Date of Patent: Sep. 27, 2022

(54) LENS APPARATUS AND CAMERA SYSTEM HAVING THE SAME

(71) Applicant: CANON KABUSHIKI KAISHA, Tokyo (JP)

(72) Inventors: Kazuhiro Noguchi, Utsunomiya (JP); Toma Kitayama, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 489 days.

(21) Appl. No.: 16/555,986

(22) Filed: Aug. 29, 2019

(65) Prior Publication Data

US 2020/0073201 A1    Mar. 5, 2020

(30) Foreign Application Priority Data

Sep. 4, 2018    (JP) .............................. JP2018-165388

(51) Int. Cl.
| | | |
|---|---|---|
| G02B 7/02 | (2021.01) | |
| G02B 27/64 | (2006.01) | |
| G03B 5/00 | (2021.01) | |
| G03B 17/14 | (2021.01) | |
| H02K 41/035 | (2006.01) | |

(52) U.S. Cl.
CPC .............. G03B 5/00 (2013.01); G02B 7/021 (2013.01); G02B 27/646 (2013.01); G03B 17/14 (2013.01); H02K 41/0354 (2013.01); G03B 2205/0007 (2013.01); G03B 2205/0069 (2013.01)

(58) Field of Classification Search
CPC .. G03B 5/00; G03B 17/14; G03B 2205/0007; G03B 2205/0069; G03B 3/10; G03B 13/34; G03B 7/02; G03B 5/02; G03B 2205/0015; G03B 2205/0038; G02B 7/021; G02B 27/646; G02B 7/08; G02B 7/04; H02K 41/0354; H02K 41/035; H02K 41/0352; H04N 5/22521; H04N 5/23287

See application file for complete search history.

(56) References Cited

U.S. PATENT DOCUMENTS

| | | | |
|---|---|---|---|
| 6,195,314 | B1 | 2/2001 | Inui |
| 6,631,042 | B2 | 10/2003 | Noguchi |
| 7,291,942 | B2 | 11/2007 | Osaka |
| 7,457,061 | B2 | 11/2008 | Sata |
| 8,224,169 | B2 | 7/2012 | Tsuruta |
| 10,423,006 | B2 | 9/2019 | Taguchi |

(Continued)

FOREIGN PATENT DOCUMENTS

| | | |
|---|---|---|
| CN | 1241771 A | 1/2000 |
| CN | 101441385 A | 5/2009 |

(Continued)

*Primary Examiner* — Robert E. Tallman
(74) *Attorney, Agent, or Firm* — Canon U.S.A., Inc. IP Division

(57) ABSTRACT

A lens apparatus includes an imaging optical system, a movable member that holds at least one lens and is movable in a direction including component perpendicular to an optical axis of the imaging optical system, a coil, a first magnet, and a shield member that covers at least a portion of the coil viewed in an optical axis direction from an image plane side, covers at least a portion of the coil viewed in a first direction perpendicular to the optical axis from one side of the movable member, and covers at least a portion of the coil viewed in the first direction from the other side of the movable member.

12 Claims, 12 Drawing Sheets

(56) References Cited

U.S. PATENT DOCUMENTS

| | | |
|---|---|---|
| 10,712,177 B2 | 7/2020 | Umehara |
| 2006/0034599 A1 | 2/2006 | Osaka |
| 2010/0080545 A1* | 4/2010 | Fan .................... H04N 5/23287 |
| | | 348/208.11 |
| 2011/0097062 A1 | 4/2011 | Tsuruta |
| 2011/0109788 A1 | 5/2011 | Santo et al. |
| 2011/0158616 A1 | 6/2011 | Chiang |
| 2015/0070564 A1* | 3/2015 | Okawa .................... G02B 7/04 |
| | | 348/345 |
| 2016/0014339 A1 | 1/2016 | Miller |
| 2016/0109721 A1 | 4/2016 | Min |
| 2017/0343886 A1 | 11/2017 | Park |
| 2018/0164603 A1 | 6/2018 | Taguchi |
| 2018/0213131 A1 | 7/2018 | Liu |
| 2018/0239217 A1* | 8/2018 | Konuma ............. H04N 5/2254 |
| 2019/0107684 A1 | 4/2019 | Osaka |
| 2019/0115818 A1 | 4/2019 | Yu |

FOREIGN PATENT DOCUMENTS

| | | |
|---|---|---|
| CN | 101515059 A | 8/2009 |
| CN | 102062926 A | 5/2011 |
| CN | 103852853 A | 6/2014 |
| CN | 104469186 A | 3/2015 |
| CN | 104820269 A | 8/2015 |
| CN | 105301733 A | 2/2016 |
| CN | 105324711 A | 2/2016 |
| CN | 105452952 A | 3/2016 |
| CN | 106662755 A | 5/2017 |
| CN | 108292022 A | 7/2018 |
| CN | 108415140 A | 8/2018 |
| EP | 3217202 A1 | 9/2017 |
| EP | 3522517 A1 | 8/2019 |
| JP | 2003322787 A | 11/2003 |
| JP | 2006171346 A | 6/2006 |
| JP | 2013-57872 A | 3/2013 |
| JP | 2013218015 A | 10/2013 |
| JP | 2014-016572 A | 1/2014 |
| JP | 2015-169883 A | 9/2015 |
| JP | 2015197627 A | 11/2015 |
| JP | 2016224143 A | 12/2016 |
| JP | 2018136570 A | 8/2018 |
| KR | 20180082384 A | 7/2018 |
| WO | 2009/133691 A1 | 11/2009 |
| WO | 2014/178260 A1 | 11/2014 |

\* cited by examiner

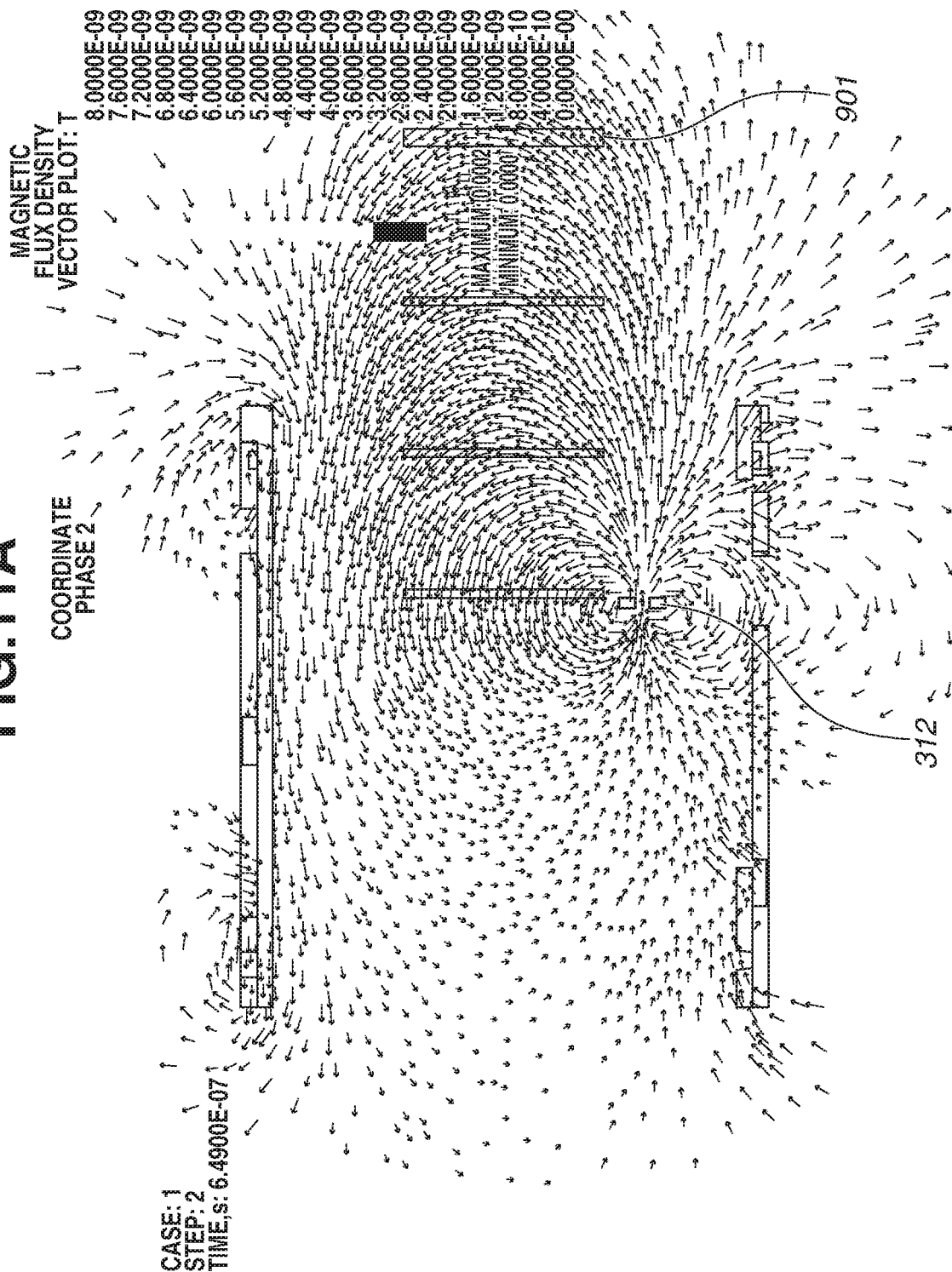

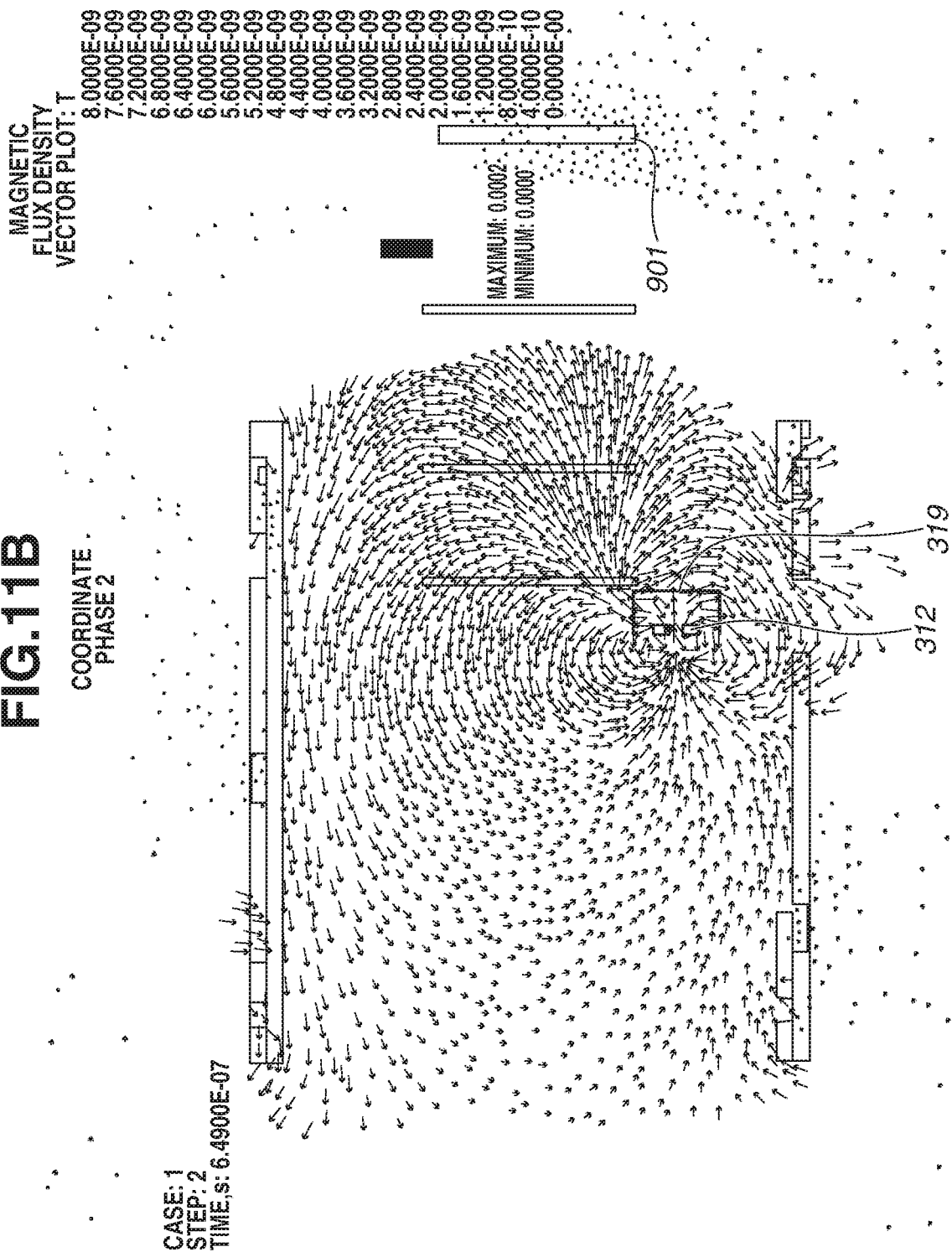

LENS APPARATUS AND CAMERA SYSTEM HAVING THE SAME

BACKGROUND OF THE INVENTION

Field of the Invention

The present invention relates to a lens apparatus and a camera system having the lens apparatus.

Description of the Related Art

There is widely known an interchangeable lens (lens apparatus) having an image-shake correction unit including a lens and a voice coil motor (VCM), and mountable on a camera body including an image sensor. When the interchangeable lens is attached to the camera body and a coil of the VCM is energized, magnetic noise generated from the coil may reach the image sensor and the quality of the captured image may be degraded.

For such a phenomenon, the camera system (i.e., interchangeable lens and camera body) discussed in Japanese Patent Application Laid-Open No. 2015-169883 stops the operation of the image-shake correction unit while charge is read out from the image sensor.

The camera system discussed in Japanese Patent Application Laid-Open No. 2015-169883 described above can suppress the degradation of the quality of the captured image due to the above-described magnetic noise. However, Japanese Patent Application Laid-Open No. 2015-169883 does not disclose a configuration for reducing the amount of magnetic noise reaching the image sensor.

SUMMARY OF THE INVENTION

The present invention is directed to a lens apparatus capable of reducing the amount of magnetic noise reaching an image sensor, and a camera system including the same.

According to an aspect of the present invention, a lens apparatus includes an imaging optical system including a plurality of lenses, a movable member that holds at least one lens among the plurality of lenses and is movable in a direction including component perpendicular to an optical axis of the imaging optical system; a coil that is provided on the movable member to drive the movable member in the direction; a shield member that covers at least a portion of the coil viewed in an optical axis direction from an image plane side, covers at least a portion of the coil viewed in a first direction perpendicular to the optical axis from one side of the movable member, and covers at least a portion of the coil viewed in the first direction from the other side of the movable member.

Further features of the present invention will become apparent from the following description of exemplary embodiments with reference to the attached drawings.

BRIEF DESCRIPTION OF THE DRAWINGS

FIGS. 11A and 11B are diagrams illustrating magnetic field simulation results according to the exemplary embodiment.

DESCRIPTION OF THE EMBODIMENTS

Figure 1:
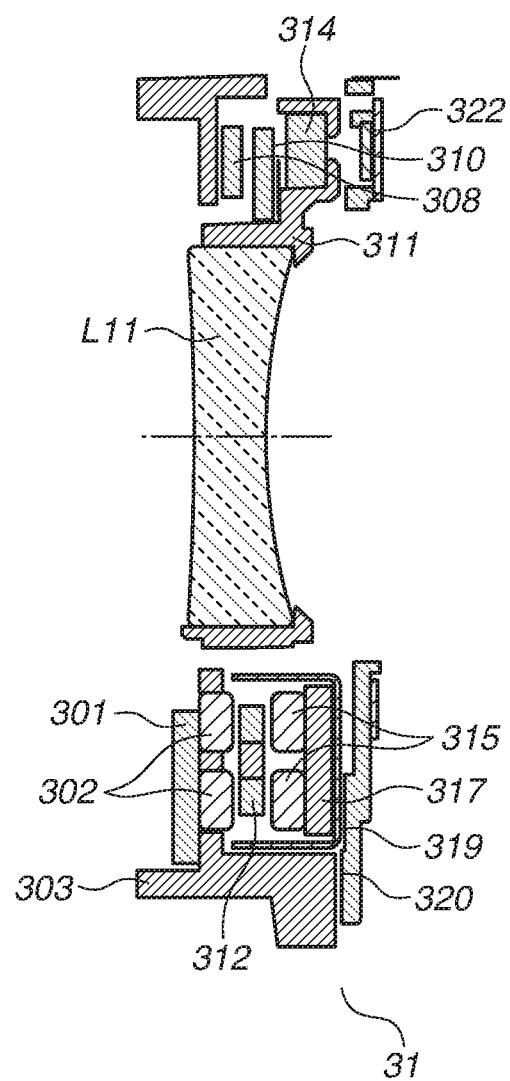
FIG. 1 is a cross-sectional view of an image-shake correction device according to an exemplary embodiment.

Hereinafter, exemplary embodiments of the present invention will be described in detail with reference to the attached drawings. The same parts are given the same numbers in the drawings.

Schematic Configuration of Lens Apparatus and Camera Body

Figure 2:
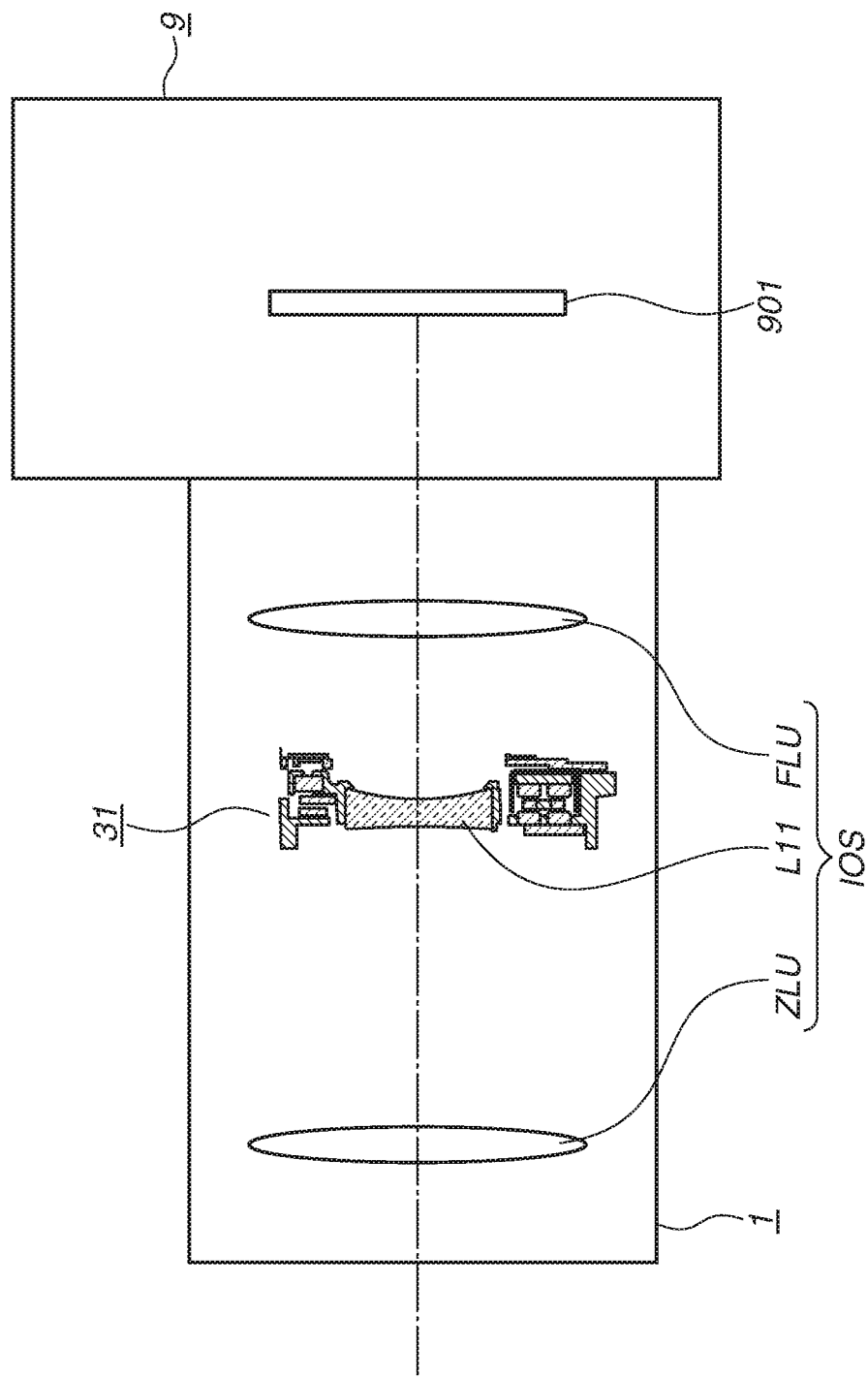
FIG. 2 is a schematic view of an interchangeable lens and a camera according to the exemplary embodiment.

A schematic configuration of an interchangeable lens (lens apparatus, or lens barrel) 1 and a camera body 9 will be described with reference to FIG. 2. FIG. 2 schematically illustrates the interchangeable lens 1 and the camera body 9.

An interchangeable lens 1 has an imaging optical system IOS and a support/drive configuration (not illustrated). The imaging optical system IOS includes a zoom lens unit ZLU, which is a lens unit that moves in an optical axis direction of the imaging optical system IOS during zooming, and a focus lens unit FLU, which is a lens unit that moves in the optical axis direction of the imaging optical system IOS during focusing. The imaging optical system IOS further includes a lens L11 described below. In the present exemplary embodiment, the imaging optical system IOS includes the zoom lens unit ZLU, but may not necessarily include the zoom lens unit ZLU. The lens unit here is a term meaning a set of a plurality of lenses or a single lens. In a case where the imaging optical system IOS includes a plurality of lens units, the boundary between the lens units is within a distance that changes during zooming or focusing.

An image sensor 901 is built in a camera body 9. The image sensor 901 receives light through the interchangeable lens 1. The interchangeable lens 1 and the camera body 9 are mechanically integrated by a mount (not illustrated). The interchangeable lens 1 is attachable to and detachable from the camera body 9 in the present exemplary embodiment. However, an image-shake correction device (image-shake correction unit) 31 configured as described below may be included in a camera system in which the interchangeable lens 1 is not detachable from the camera body 9.

Light flux from an object forms an image on the image sensor 901 by the imaging optical system IOS of the interchangeable lens 1. Further, the interchangeable lens 1 and the camera body 9 are also electrically connected by an electrical contact described below, and the interchangeable lens 1 and the camera body 9 communicate with each other to perform image capturing. The image sensor 901 is a solid-state image sensor such as a complementary metal oxide semiconductor (CMOS) sensor that converts charges generated in proportion to the amount of light incident on pixels into a voltage signal.

The image-shake correction device 31 is included in the interchangeable lens 1. The lens L11 constitutes a part of the imaging optical system. Moving the lens L11 in a plane orthogonal to an optical axis corrects image shake. The lens L11 merely needs to be movable in a direction intersecting the optical axis of the imaging optical system IOS, and may not move exactly in a direction orthogonal to the optical axis. The lens L11 is a single lens in the present exemplary embodiment, but may be a set of a plurality of lenses.

Block Configuration of Lens Apparatus and Camera Body

Figure 3:
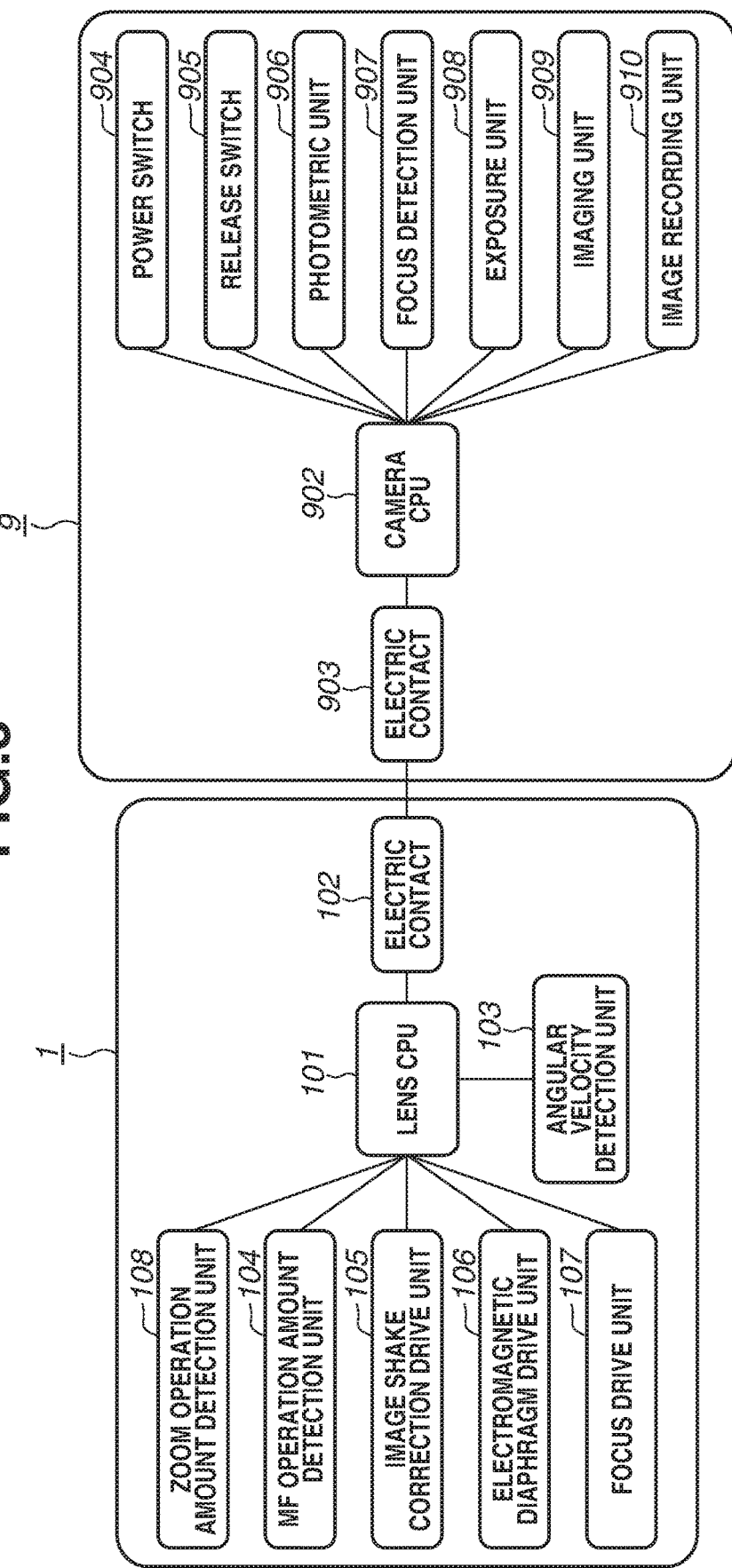
FIG. 3 is a block diagram illustrating a configuration of a camera system according to the exemplary embodiment.

A configuration of the interchangeable lens 1 and the camera body 9 will be described with reference to FIG. 3. FIG. 3 is a block diagram illustrating a configuration of a camera system including the interchangeable lens 1 and the camera body 9 according to the present exemplary embodiment. A camera central processing unit (CPU) (camera-side control unit) 902 is constituted by a microcomputer to control the operation of each unit in the camera body 9. When the interchangeable lens 1 is attached, the camera CPU 902 communicates with the lens CPU (lens-side control unit) 101 provided in the interchangeable lens 1 via an electrical contact 102 and an electrical contact 903. The information transmitted from the camera CPU 902 to the lens CPU 101 includes driving amount information of the focus lens and the like. The information transmitted from the lens CPU 101 to the camera CPU 902 includes imaging magnification information. The electrical contact 102 and the electrical contact 903 each include not only an electrical contact for communication between the interchangeable lens 1 and the camera body 9 but also an electrical contact for supplying power from the camera body 9 to the interchangeable lens 1.

A power switch 904 is a switch operable by a user, and is operated to start the camera CPU 902 and to start power supply to actuators, sensors, and the like in the camera system. A release switch 905 is a switch operable by a user, and has a first stroke switch SW1 and a second stroke switch SW2. Signals from the release switch 905 are input to the camera CPU 902. The camera CPU 902 enters an image-pickup preparation state in response to an input of an ON signal from the first stroke switch SW1. In the image-pickup preparation state, a photometry unit 906 measures object illuminance and a focus detection unit 907 performs focus detection. The camera CPU 902 calculates an aperture value of an aperture unit (not illustrated) mounted in the interchangeable lens 1, an exposure amount of the image sensor 901 (shutter speed), and the like based on the photometry result.

The camera CPU 902 also determines the driving amount of the focus lens unit FLU for obtaining the in-focus state with respect to the object based on the focus information of the imaging optical system IOS provided by the focus detection unit 907. The information of the driving amount (focus lens driving amount information) is transmitted to the lens CPU 101. The lens CPU 101 controls the operation of each component of the interchangeable lens 1. For example, the lens CPU 101 controls a focus drive unit 107 based on the focus lens driving amount information transmitted from the camera CPU 902. The focus drive unit 107 is an actuator for moving the focus lens unit FLU in the optical axis direction.

The camera CPU 902 further starts the control of the image stabilization by the image-shake correction device 31 in a predetermined imaging mode. When the ON signal from the second stroke switch SW2 is input, the camera CPU 902 transmits an aperture drive command to the lens CPU 101 to set the aperture unit to the aperture value calculated as described above. In other words, the lens CPU 101 controls an electromagnetic diaphragm drive unit 106 based on the diaphragm drive command transmitted from the camera CPU 902. The electromagnetic diaphragm drive unit 106 is an actuator for changing the diameter of the aperture formed by a plurality of diaphragm blades of the aperture unit.

The camera CPU 902 transmits an exposure start command to the exposure unit 908 to perform a withdrawal operation of a mirror (not illustrated) and an opening operation of a shutter (not illustrated), so that an image pickup unit 909 including the image sensor 901 performs an exposure operation of an object image. An image-pickup signal from the image pickup unit 909 (image sensor 901) is converted into a digital signal by a signal processing unit in the camera CPU 902, then subjected to various types of correction processing, and output as an image signal. The image signal data is written and stored in a recording medium including a semiconductor memory such as a flash memory, a magnetic disk, and an optical disk at an image recording unit 910.

A zoom operation amount detection unit 108 detects the rotation of the zoom ring (not illustrated) by a sensor (not illustrated). A manual focus (MF) operation amount detection unit 104 detects the rotation of a manual focus ring (not illustrated) by a sensor (not illustrated).

An image-shake correction drive unit (coil drive unit) 105 includes a drive actuator of the image-shake correction device 31 and its drive circuit. The electromagnetic diaphragm drive unit 106 brings the aperture unit into an aperture state equivalent to the designated aperture value by the lens CPU 101 that has received the diaphragm drive command from the camera CPU 902. The focus drive unit 107 drives a focus lens by a focus drive mechanism (not illustrated) based on focus driving amount information transmitted from the camera CPU 902.

An angular velocity detection unit 103 includes an angular velocity sensor (not illustrated). The angular velocity detection unit 103 detects a pitch direction (longitudinal rotation) shake and a yaw direction (lateral rotation) shake, which are angular shakes by an angular velocity sensor, and outputs these angular velocities to the lens CPU 101. The lens CPU 101 integrates angular velocity signals in the pitch direction and the yaw direction from the angular velocity sensor, and calculates angular displacement amounts in the pitch direction and the yaw direction. The lens CPU 101 then causes the image-shake correction drive unit 105 corresponding to the angular displacement amounts in the pitch direction and the yaw direction described above to drive and shift the lens L11 of the image-shake correction device 31 in the longitudinal direction and the lateral direction (directions crossing the optical axis, directions including component perpendicular to the optical axis), thereby performing image-shake correction.

Configuration of Image-Shake Correction Device

Figure 4:
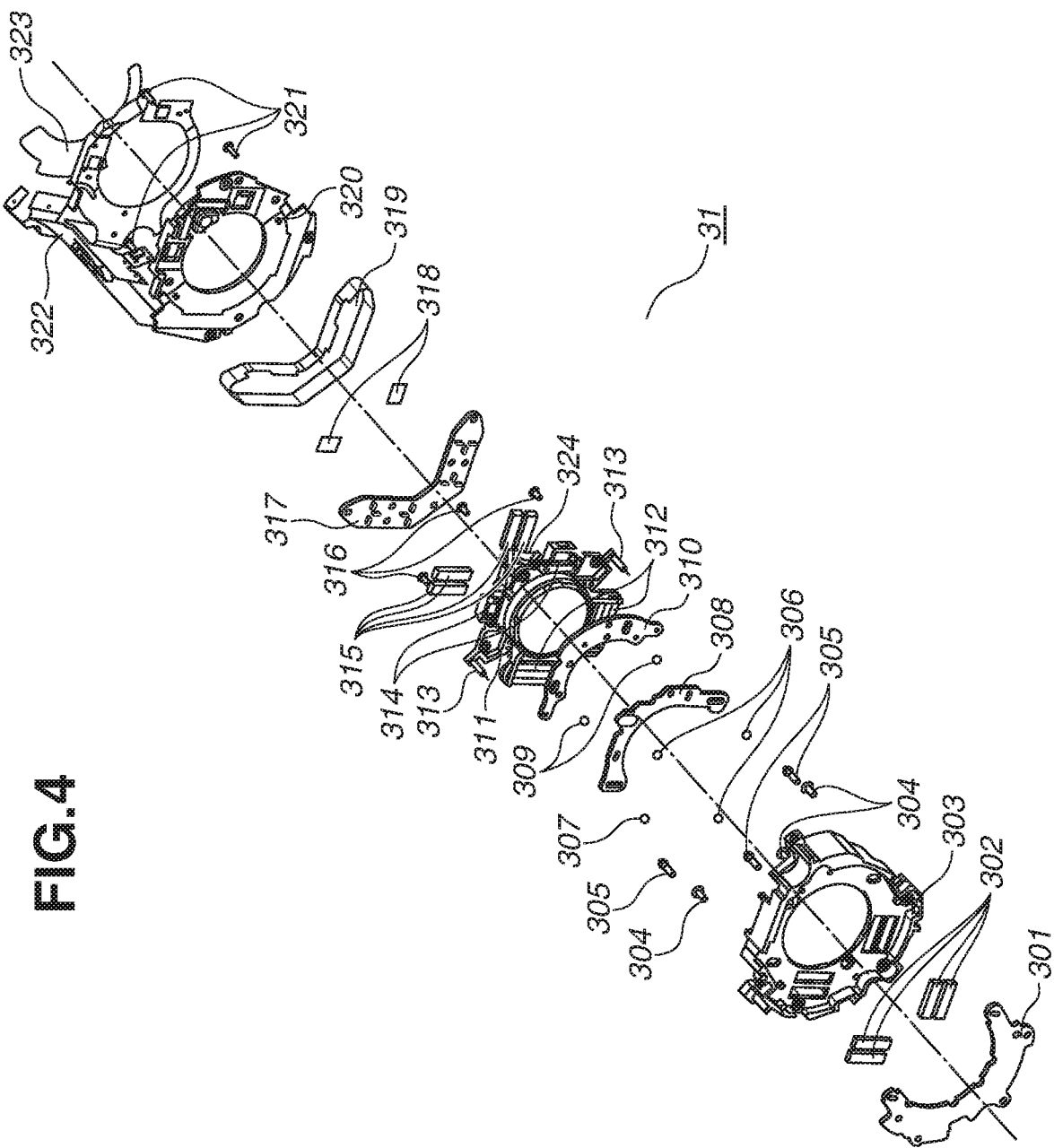
FIG. 4 is an exploded perspective view of the image-shake correction device according to the exemplary embodiment viewed from the object side.
Figure 5:
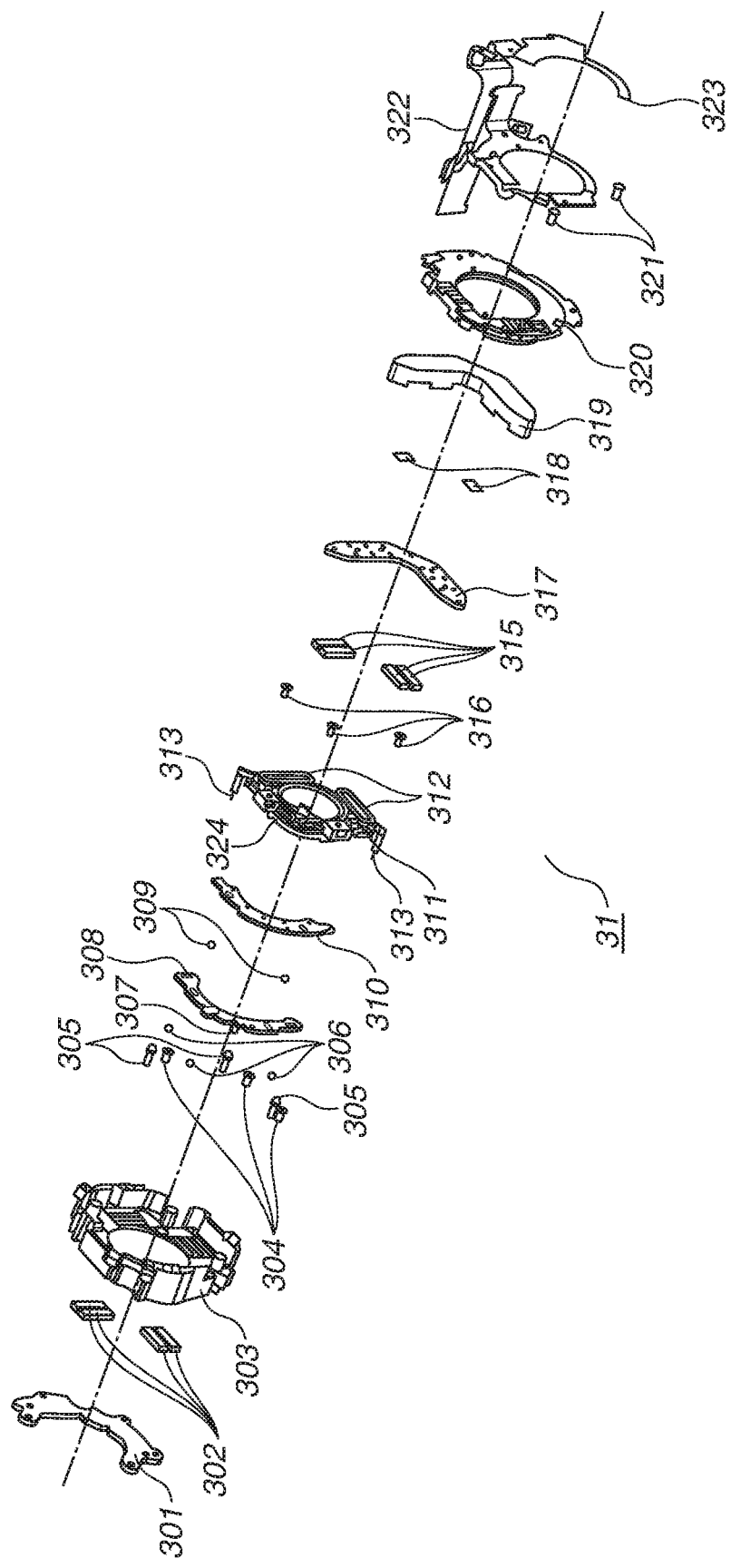
FIG. 5 is an exploded perspective view of the image-shake correction device according to the exemplary embodiment from the image plane side.

Next, a configuration of the image-shake correction device 31 will be described with reference to FIGS. 1, 4, and 5. FIG. 1 is a cross-sectional view of the image-shake correction device 31. FIG. 4 is an exploded perspective view of the image-shake correction device 31 viewed from the object side. FIG. 5 is an exploded perspective view of the image-shake correction device 31 viewed from the image plane side.

A first yoke 301 made of a magnetic material is screwed to a base plate (fixed frame or fixed member) 303 with fastening screws 304. First drive magnets 302 are fixed to the first yoke 301 by magnetic attraction through an opening provided in the base plate 303. In other words, the first drive magnets 302 for driving a movable lens barrel 311 described below in a direction crossing the optical axis are provided on the base plate 303. The movement of the base plate 303 in the direction crossing the optical axis is restricted.

The first drive magnets 302 are permanent magnets such as neodymium magnets. The movable lens barrel (movable frame or movable member) 311 holds the lens L11, which is an image-shake compensating optical element. Moving the lens L11 in a plane orthogonal to the optical axis makes it possible to correct camera shake. Coils (driving coils) 312 as driving coils and position detecting magnets 314 are fixed to the movable lens barrel 311. In other words, the coils 312 for driving the movable lens barrel 311 in the direction crossing the optical axis are provided on the movable lens barrel 311.

A first guide plate 310 is screwed to the movable lens barrel 311 with fastening screws 316. A second guide plate 308 is supported to be movable in a vertical direction (second direction) in a plane perpendicular to the optical axis with respect to the base plate 303 via first rolling balls 306. The movable lens barrel 311 to which the first guide plate 310 is fixed is supported to be movable in a lateral direction (third direction) in a plane orthogonal to the optical axis with respect to the second guide plate 308 via second rolling balls 309.

In addition, the movable lens barrel 311 to which the first guide plate 310 is fixed is supported to be movable in the directions (second and third directions) orthogonal to the optical axis with respect to the base plate 303 via a third rolling ball 307. The movable lens barrel 311 is always tensed by tensile springs 313 with respect to the base plate 303. In this way, the movable lens barrel 311 is movable in a plane perpendicular to the optical axis while its rotation around the optical axis is suppressed.

A second yoke 317 is fixed by magnetic attraction while second drive magnets 315 are positioned by protrusions provided on the second yoke 317. The second drive magnets 315 are also permanent magnets such as neodymium magnets.

The second yoke 317 sandwiches columns (air gap-forming members) 305 as a part of a support unit (air gap-forming unit), together with the first yoke 301. The second yoke 317 is fixed to the first yoke 301 by the magnetic attraction force generated between the first drive magnets 302 and the second drive magnets 315.

The coils 312 fixed to the movable lens barrel 311 are disposed in an air gap between the first drive magnets 302 and the second drive magnets 315. The first yoke 301 and the first drive magnets 302 constitute the object side configuration of the magnetic circuit, and the second yoke 317 and the second drive magnets 315 constitute the image plane side configuration of the magnetic circuit.

The air gap as in the optical axis direction between the first drive magnets 302 and the second drive magnets 315 or the air gap in the optical axis direction between the first yoke 301 and the second yoke 317 is formed by the columns 305.

A horizontally striped noise suppression sheet metal (magnetic field fluctuation suppression unit, shield member, or noise suppression sheet metal) 319 is adhesively fixed to the second yoke 317 by double-sided tapes 318. The noise suppression sheet metal 319 is made of nonmagnetic conductive material such as copper or aluminum. The action of the noise suppression sheet metal 319 will be described below. A first flexible substrate 322 including a Hall sensor for position detection is fixed to a sensor holding plate 320. The sensor holding plate 320 is fixed together with the first flexible substrate 322 to the base plate 303 by a retaining plate metal 323 and retaining screws 321.

The second flexible substrate 324 is electrically connected to the coils 312 by soldering. In addition, an edge of the second flexible substrate 324 is electrically connected to a connector portion provided on the first flexible substrate 322. The first flexible substrate 322 is electrically connected to a printed circuit board (not illustrated).

When the coils 312 are energized, the Lorentz force is generated, and the movable lens barrel 311 moves in a plane orthogonal to the optical axis. Two sets of the coils 312, the first drive magnets 302, and the second drive magnets 315 are arranged in two directions orthogonal to each other. Thus, the movable lens barrel 311 can freely move within a predetermined range in a plane orthogonal to the optical axis by a combination of driving forces in the two directions. The Hall sensor included in the first flexible substrate 322 converts the magnetic flux density of the position detecting magnets 314 into an electrical signal. The relative position of the movable lens barrel 311 to the base plate 303 is detected by the Hall sensor.

Configuration Around Shield Member

Figure 6A:
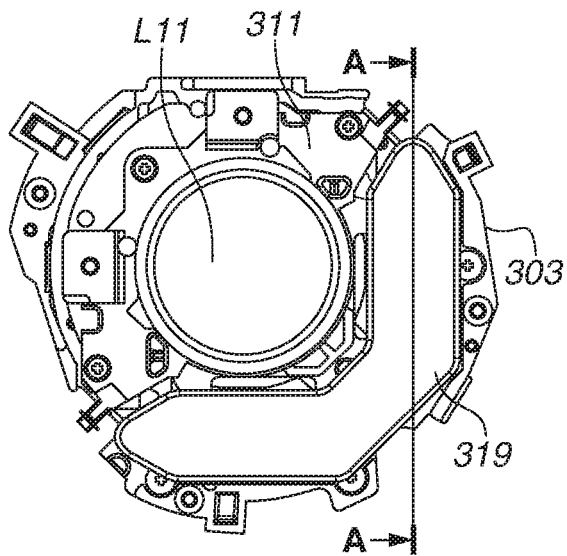
FIGS. 6A, 6B, and 6C are plan views of the image-shake correction device according to the exemplary embodiment from the image plane side.
Figure 6B:
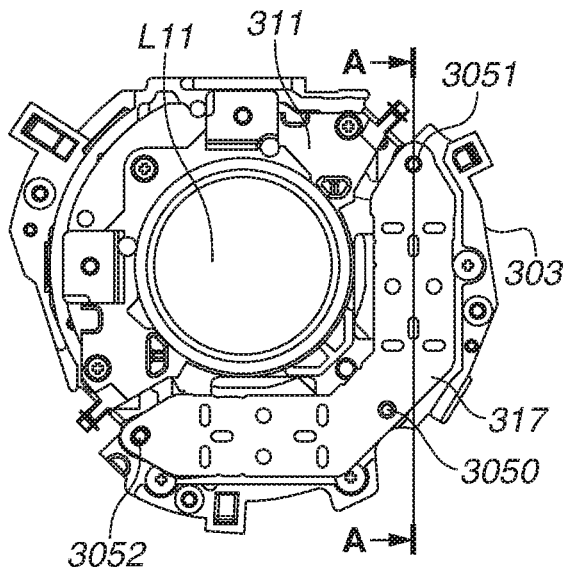
Figure 6C:
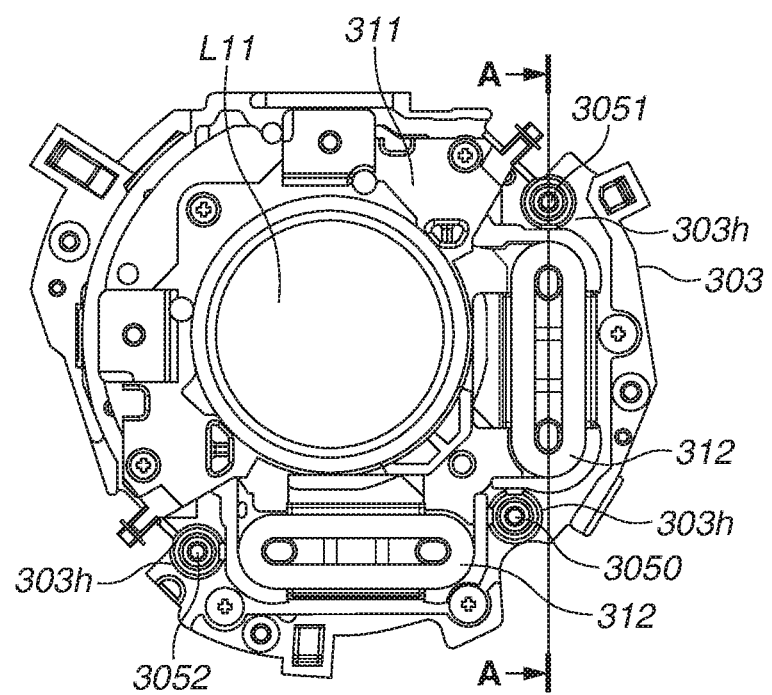

Further, a configuration around the noise suppression sheet metal 319 will be described with reference to FIGS. 6A to 8C. FIGS. 6A to 6C are plan views of the image-shake correction device 31 viewed from the image plane side. FIG. 6A does not illustrate the members on the image plane side so that the noise suppression sheet metal 319 is exposed. The main members illustrated in FIG. 6A are the base plate 303, the movable lens barrel 311, and the lens L11. FIG. 6B further does not illustrate the noise suppression sheet metal 319 and the double-sided tapes 318. As a result, in FIG. 6B, the second yoke 317 and the three columns 305 are exposed.

FIG. 6C further does not illustrate the second yoke 317 and the second drive magnets 315. As a result, in FIG. 6C, column holders 303h as portions of the supporting unit, which are portions of the base plate 303 holding the coils 312 and the three columns 305, are exposed. The three columns 305 have the same shape, but they are distinguished in such a manner that the upper right one in the paper surface of FIG. 6C is set as a column 3051, the lower left one as 3052, and the remaining one as 3050.

Figure 7:
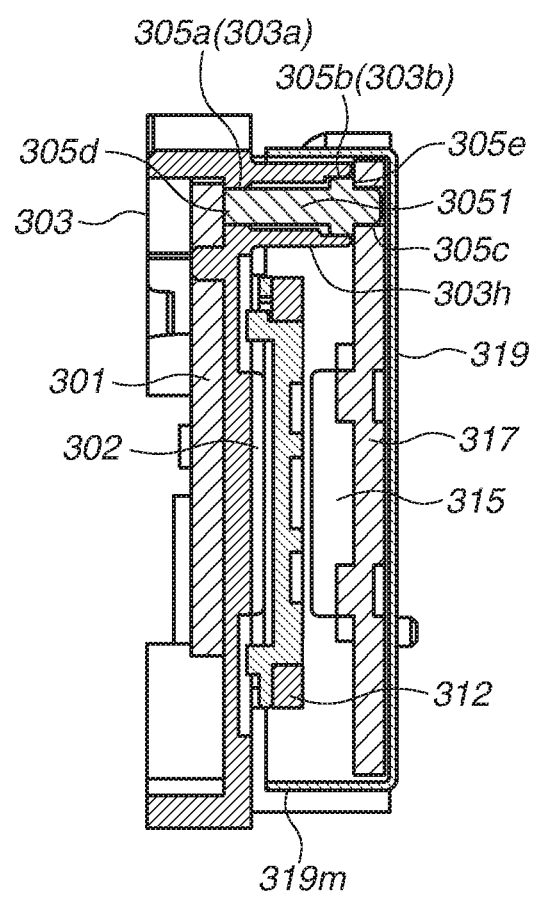
FIG. 7 is a cross-sectional view of a drive unit of the image-shake correction device according to the exemplary embodiment.
Figure 8A:
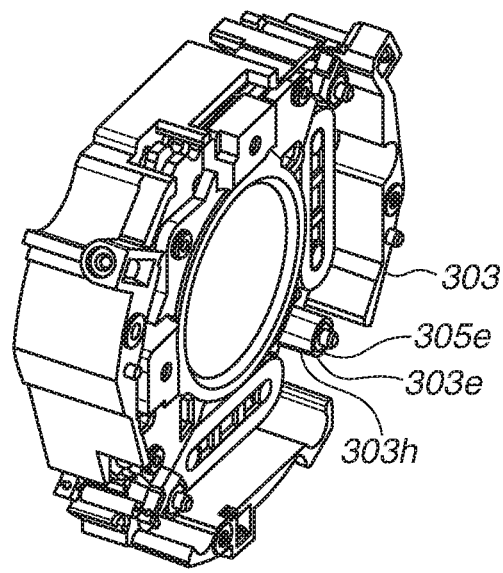
FIGS. 8A, 8B, and 8C are perspective views of the image-shake correction device according to the exemplary embodiment from the image plane side.
Figure 8B:
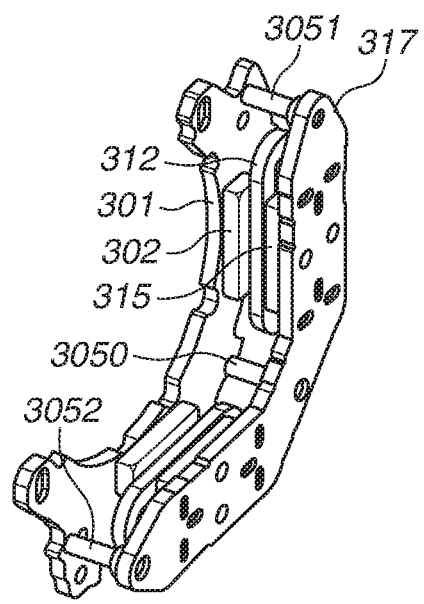
Figure 8C:
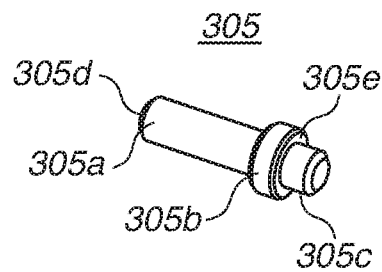

FIG. 7 is a cross-sectional view of a drive unit of the image-shake correction device and its vicinity at a position taken by line A-A in FIG. 6A. The same cross-sectional position is indicated by line A-A in FIGS. 6B and 6C so that the position of the cross-section becomes clear. FIGS. 8A to 8C are perspective views of the image-shake correction device viewed from the image plane side. FIG. 8A is a perspective view of the state illustrated in FIG. 6C, FIG. 8B is a perspective view of the components (magnets, yokes, and coils) and the columns 3050, 3051, and 3052 constituting a magnetic circuit, and FIG. 8C is a perspective view of the column 305.

The shape of each of the columns 305 will be described with reference to FIG. 8C. The column 305 includes three coaxial shaft portions 305a, 305b, and 305c. Referring to FIG. 7, the shaft portion 305a is fitted in a hole portion 303a provided on the object side of the column holder 303h of the base plate 303. Further, the shaft portion 305b is fitted in a hole portion 303b provided on the image plane side of the column holder 303h. As a result, the column 305 is arranged so that the axial direction of the column 305 is parallel to the optical axis direction (direction parallel to the optical axis).

The shaft portion 305a of each of the columns 305 has an object side end surface 305d in contact with the surface of the first yoke 301 to which the first drive magnets 302 are magnetically attracted. The shaft portion 305b of each of the columns 305 has an image plane-side end surface 305e in contact with the surface of the second yoke 317 to which the second drive magnets 315 are magnetically attracted. As a result, the object side configuration including the first yoke 301 and the first drive magnets 302 of the magnetic circuit and the image plane side configuration including the second yoke 317 and the second drive magnets 315 have air gaps therein formed by the three columns 305. The coils 312 are located in the air gaps.

Further, as illustrated in FIGS. 7 and 8A, the image plane-side end surfaces 303e of the column holders 303h are shifted by about 0.1 to 0.3 mm to the object side with respect to the image plane-side end surfaces 305e of the shaft portions 305b in contact with the second yoke 317. As a result, there is a gap between the image plane-side end surfaces 303e of the column holders 303h and the second yoke 317. In other words, the second yoke 317 is not in contact with the image plane-side end surfaces 303e of the column holders 303h, but is in contact with the image plane-side end surfaces 305e of the shaft portions 305b of the columns 305. In this way, the attraction force of the drive magnets in the optical axis direction prevents the deformation of the base plate 303 supported by only the three columns 305.

The material of the columns 305 is preferably a metal with sufficient strength such as brass. The shaft portion 305c of the column 3051 is fitted in the hole of the second yoke 317, and the shaft portion 305c of the column 3052 is fitted in the elongated hole of the second yoke 317, so that the second yoke 317 is positioned on the base plate 303 via the column holders 303h.

Configuration of Shield Member

The noise suppression sheet metal 319 has a box shape in which only the object side direction is opened as illustrated in the exploded perspective view seen from the object side of FIG. 4. As illustrated in FIGS. 6A, 6B, and 6C, the noise suppression sheet metal 319 is arranged to surround the image plane-side configuration of the magnetic circuit including the second yoke 317 and the second drive magnets 315 and the column holders 303h constituting the support unit, and the columns 305. In other words, the columns 305 are located inside the noise suppression sheet metal 319. In the cross section illustrated in FIG. 7, an object side end surface 319m of the noise suppression sheet metal 319 is arranged to surround the coils 312 in excess of the object-side surface.

The shape of the noise suppression sheet metal 319 can also be expressed as follows. Specifically, the noise suppression sheet metal 319 covers at least a part of the coils 312 as viewed in the optical axis direction from the image plane side of the imaging optical system IOS. The noise suppression sheet metal 319 also covers at least a part of the coils 312 as viewed in a direction crossing the optical axis (as viewed in a first direction perpendicular to the optical axis) from one side and the other side of the coils 312. The noise suppression sheet metal 319 has a box-like shape opened to the object side of the imaging optical system IOS. Furthermore, the noise suppression sheet metal 319 is not opened to the image plane side of the imaging optical system IOS.

In the present exemplary embodiment, the noise suppression sheet metal 319 is a copper sheet formed into a box shape by a drawing process, but the material of the drawn-processed suppression sheet metal 319 may be any nonmagnetic conductive material other than copper. Alternatively, the noise suppression sheet metal 319 may be formed by a processing method other than drawing processing. In other words, as illustrated in FIG. 6A, the entire coils 312 are not exposed from the noise suppression sheet metal 319 as viewed in the optical axis direction from the image plane side of the imaging optical system IDS.

Description of Pulse Width Modulation (PWM) Driving

Figure 9A:
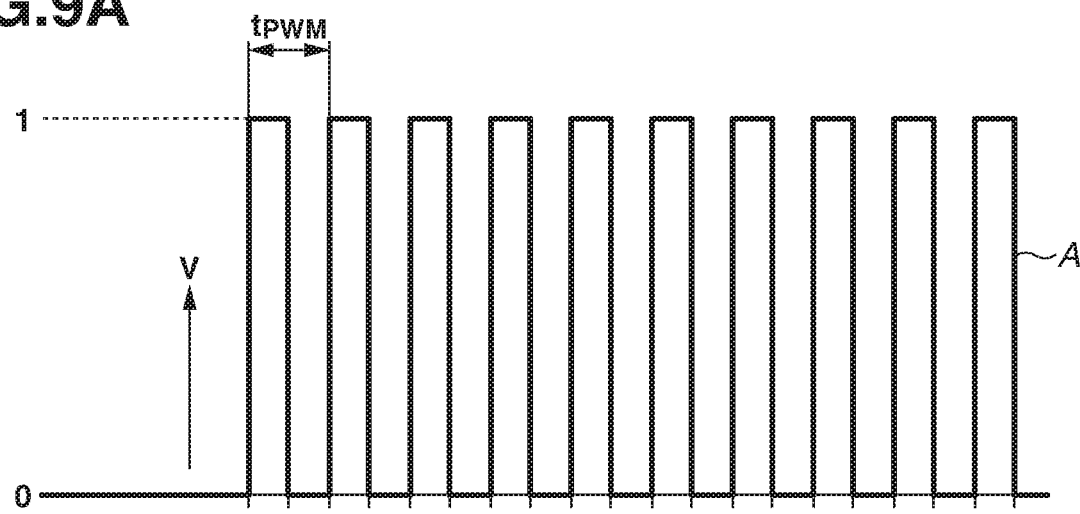
FIGS. 9A and 9B are diagrams illustrating pulse width modulation (PWM) drive according to the exemplary embodiment.
Figure 9B:
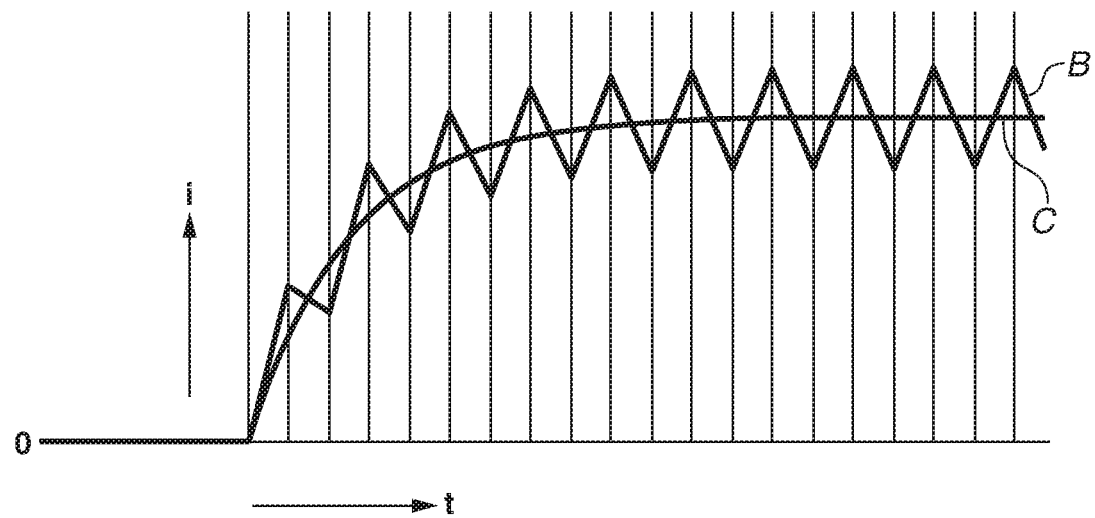

The PWM driving of each of the coils 312 will be described with reference to FIGS. 9A and 9B. FIGS. 9A and 9B are diagrams illustrating the PWM driving. FIG. 9A is a graph illustrating a drive voltage applied to each coil, and FIG. 9B is a graph illustrating a value of current flowing in the coil. The horizontal axis indicates elapsed time at equal intervals. The PWM driving is a driving method for setting the value of current flowing in the coil to a desired value by time average by a driving voltage of repeated turn-on and turn-off with a target pulse width. The PWM driving is widely used in mobile devices powered by a battery because of the convenience of microcomputer driving and of having lower power consumption.

In the graph illustrated in FIG. 9A, a voltage waveform is indicated by A, 0 in the vertical axis means that the voltage is 0 V, and 1 in the vertical axis means the normalized maximum usable voltage. The width indicated by tPWM is the time width of one cycle of PWM driving. In the graph illustrated in FIG. 9A, the time ratio of 1 and 0 in one cycle is a half state, and this case will be called a duty of 50%.

In the graph illustrated in FIG. 9B, B indicates the value of current flowing in the coil to which the voltage of the voltage waveform A is applied. The fluctuation range is illustrated exaggeratedly for the purpose of explanation. A current value C exhibiting a smooth change in the graph illustrated in FIG. 9B represents the value of current flowing in the coils when a normalized voltage of 0.5 from the state of voltage 0 V is continuously applied. The rise of the current value is inclined due to the influence of the coil inductance. When a certain time elapses and a steady state is reached, the current value C and the time average value of the current value B in the PWM driving become the same. In other words, the time average value of the current value B can be controlled by changing the time ratio (duty ratio) of 1 and 0.

In this case, the fact that the current value flowing in the coils fluctuates at the drive frequency of PWM driving means that the generated driving force as voice coil motor (VCM) also fluctuates in the same manner. However, since the driven body (lens L11 in the present exemplary embodiment) driven by the VCM has a mass, the displacement with respect to the applied driving force becomes smaller as the frequency of the generated driving force fluctuation becomes higher. Thus, the influence of the generated driving force fluctuation is substantially eliminated by setting the drive frequency of the PWM driving appropriately high depending on the mass of the driven body. However, the magnetic field produced by the current flowing in the coils around the coils varies in intensity depending on the current value fluctuation in PWM driving.

Schematic Views of Magnetic Fields Generated by Driving Coils

Figure 10A:
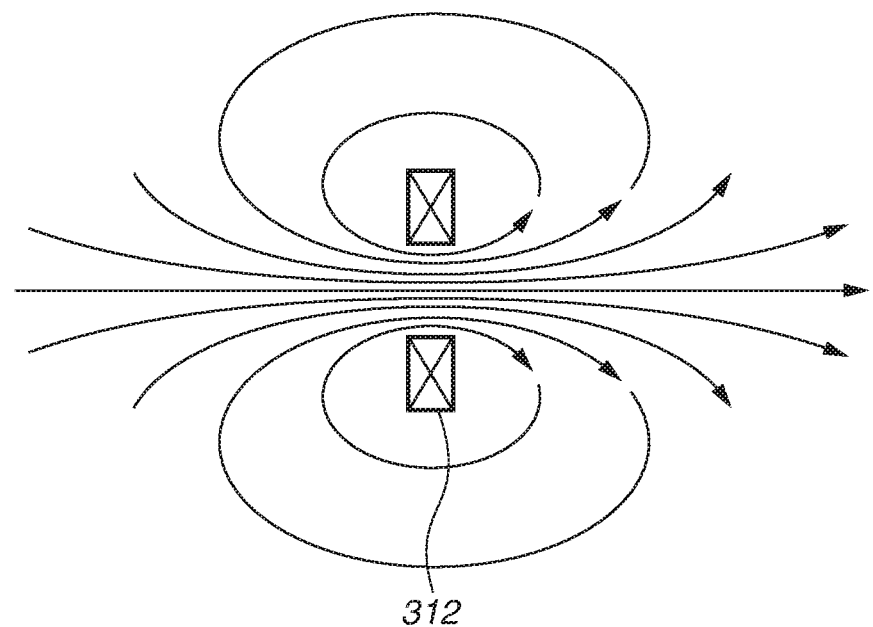
FIGS. 10A and 10B are schematic diagrams illustrating a state of a magnetic field generated by a coil according to the exemplary embodiment.
Figure 10B:
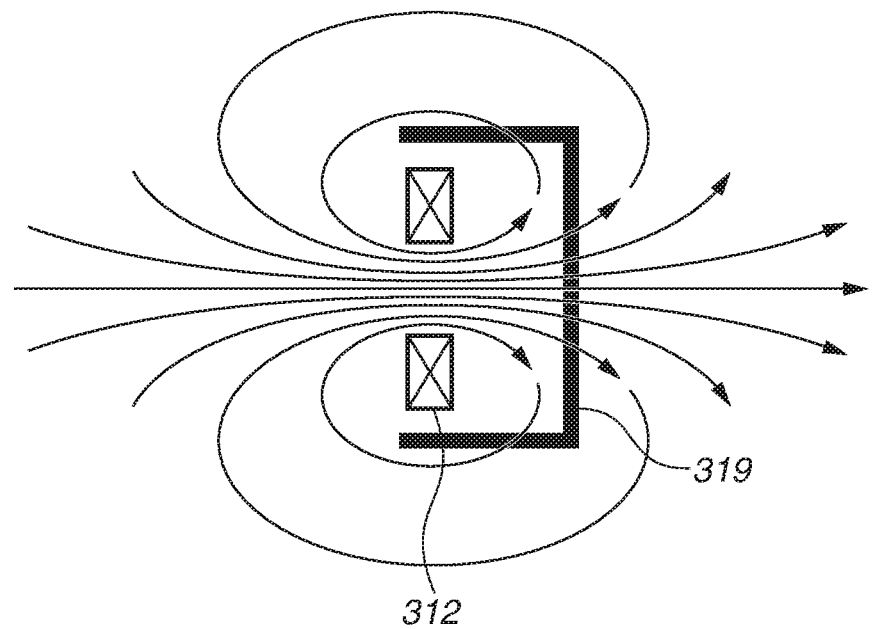

Magnetic fields generated by the coils 312 will be described with reference to FIGS. 10A and 10B. FIGS. 10A and 10B are schematic views of magnetic fields generated by the coil 312. FIG. 10A is a diagram schematically illustrating a magnetic field only in the presence of the coil 312. FIG. 10B is a diagram schematically illustrating a magnetic field in a case where there is the noise suppression sheet metal 319 described above in addition to the coil 312. FIGS. 10A and 10B are views in the same direction as the cross-sectional view of FIG. 1, and the right side on the plane of FIGS. 10A and 10B is the image plane side.

FIGS. 10A and 10B schematically illustrate magnetic lines of force around the coil 312 generated by energizing the coil 312. Arrows indicate the directions of magnetic field lines. As a physical characteristic, the magnetic field lines in the same direction repel each other, one magnetic field line is always closed and attempts to be as short as possible in space. In addition, four magnetic field lines near the cross sections of the coil as seen in the vertical direction are closed (connected from beginning to end). The five lines in the vicinity of the center at the center of the cross sections of the coil are represented as having both ends due to space limitation, but actually, the both ends are connected together making a detour. FIGS. 10A and 10B illustrate a certain cross section, and actually, a magnetic field is generated three-dimensionally in a three-dimensional space.

It can be easily imagined that the magnetic field lines generated by the coils spread widely due to their repulsive nature. However, as the magnetic field lines spread, the magnetic flux densities (corresponding to the distances between the magnetic field lines) become lower. When the coils 312 are PWM-driven as described with reference to FIGS. 9A and 9B, intensity variations of the magnetic field corresponding to the current value fluctuation are superimposed on the respective magnetic field lines.

As illustrated in FIG. 10B, in the present exemplary embodiment, the box-shaped noise suppression sheet metal 319 opened to only the object side direction is disposed to surround the coils 312. The noise suppression sheet metal 319 is a nonmagnetic conductive material. Therefore, the noise suppression sheet metal 319 does not interact with a magnetic field that does not change in intensity. However, as is well known, a nonmagnetic conductive substance acts so that eddy current flows into a magnetic field and the intensity changes by electromagnetic induction to prevent the intensity change.

Accordingly, in the present exemplary embodiment, as illustrated in FIG. 10B, the box-shaped noise suppression sheet metal 319 opened to only the object side direction is located to surround the coils 312 so that most of the magnetic field lines directed toward the image plane side pass through. As a result, the intensity change of the magnetic field superimposed by the PWM driving is prevented by the magnetic field lines passing through the object side opening of the noise suppression sheet metal 319 to suppress the generation of noise. The effect becomes greater as the conductivity is higher. Examples of metals high in electrical conductivity include, in descending order, silver, copper, gold, and aluminum, and alloys having these metals as a base material are generally low in electrical conductivity. Thus, copper and aluminum are preferable materials.

Simulation Results of Magnetic Fields Generated from Driving Coils

The simulation results of magnetic fields generated from the coils 312 will be described with reference to FIGS. 11A and 11B. FIGS. 11A and 11B illustrate the simulation results of magnetic fields generated from the coils 312 at the time of image-shake correction driving of the image-shake correction device 31. More specifically, FIGS. 11A and 11B illustrate the results of simulating distribution of magnetic field lines and magnetic flux densities around the coils 312 in a case where a current that changes in positive and negative directions at a high frequency of several tens of kHz is supplied to the coils 312. FIG. 11A illustrates a simulation result as a comparative example without the noise suppression sheet metal 319, and FIG. 11B illustrates a simulation result in a case with the noise suppression sheet metal 319. As vectors with arrows, the directions and lengths of the magnetic field lines indicate the intensities of magnetic fields.

It can be seen from the result illustrated in FIG. 11A that, without the noise suppression sheet metal 319, the fluctuation of the magnetic field (magnetic flux density) generated when a current is flown to the coils 312 for the image-shake correction has a large value at the position of the image sensor 901. Thus, the image quality of the image signal is degraded by the image sensor 901 under large fluctuation in the magnetic field (magnetic flux density). More specifically, when a magnetic field fluctuating at a high frequency of about several tens of kHz acts on a signal line for extracting an image signal as voltage information from the image sensor 901, an electromotive force is induced by electromagnetic induction that will become noise. As a result, in the CMOS sensor, horizontal pixels may be read at one time, and noise periodically fluctuating in positive and negative directions may be superimposed on horizontal pixel information read out sequentially, resulting in horizontal stripe noise and image quality deterioration. However, in the image-shake correction device 31 according to the present exemplary embodiment, the noise suppression sheet metal 319 is disposed to cover the coils 312, which produces the result as illustrated in FIG. 11B. It can be seen from FIG. 11B that the amount of fluctuation in the magnetic field (magnetic flux density) generated when a current similar to that of FIG. 11A is flown to the coils 312 for image-shake correction is significantly reduced at the position of the image sensor 901 compared with the case illustrated in FIG. 11A.

It is assumed that the magnetic field fluctuation (magnetic noise) generated at the driving of the lens L11 for image-shake correction has reached the image sensor 901 that is a solid-state image pick up element such as a CMOS sensor. In this case, periodically induced electromotive force may be generated in the readout circuit of the horizontal image signal so that horizontal stripe noise is, in some cases, superimposed on the image-pickup signal. However, as described above, the interchangeable lens 1 according to the present exemplary embodiment includes the noise suppression sheet metal 319 of the shape described above, thereby to reduce the amount of magnetic noise reaching the image sensor 901.

In particular, when the camera body 9 is a mirrorless camera having no quick-return mirror, the camera body 9 is smaller in size than the camera body 9 of a single-lens reflex camera. As a result, the distance between the coils 312 and the image sensor 901 in the optical axis direction becomes short. Therefore, when the camera body 9 is a mirrorless camera, the advantageous effect produced by the noise suppression sheet metal 319 is particularly important. Furthermore, in recent years, the image sensor has been further increased in sensitivity, and the influence of the horizontal stripe noise described above has become more significant, so that the advantageous effect produced by the noise suppression sheet metal 319 is also important.

If the power to the VCM in the image-shake correction device is cut off during the period of charge readout as described in Japanese Patent Application Laid-Open No. 2015-169883, the holding power of the image-shake correction device for cancelling its own weight decreases while the power is off. As a result, the position of the optical lens for image-shake correction changes during the period of reading out the charge. The position of the optical lens needs to be returned to the original position because the position of the optical lens changes, which leads to a decrease in continuous image capturing speed. However, the interchangeable lens 1 according to the present exemplary embodiment includes the noise suppression sheet metal 319 of the shape described above, thereby to reduce the amount of magnetic noise reaching the image sensor. For this reason, in the present exemplary embodiment, it is not necessary to perform a control to cut off the current supply to the VCM in the image-shake correction device during the period of reading out the charge as described in Japanese Patent Application Laid-Open No. 2015-169883.

Modification Examples

Preferable exemplary embodiments of the present invention have been described above. However, the present invention is not limited to these exemplary embodiments but various modifications and changes are possible within the gist of the present invention.

For example, in the coils 312 according to the present exemplary embodiment, magnets for driving (first drive magnets 302 and second drive magnets 315) are opposed to the coils 312 on both the object side and the image plane side. Opposing the magnets for driving to the coils 312 on the both sides makes it possible to increase the magnetic flux density in the air gap of the magnetic circuit. This reduces the amount of current flowing to the coils 312 at the time of image-shake correction, and reduces the magnetic field fluctuation caused by the coils 312. This is more preferable from the viewpoint of suppressing image quality deterioration. However, the present invention is not limited to the above-described configuration. The magnets for driving may be provided only on the object side (first drive magnets 302) without providing the second drive magnets 315 to ensure the large occupied volume of the coils and increase the number of windings of the coils, thereby obtaining necessary driving force. When the magnets for driving are provided only on one side, the magnetic flux density in the air gap of the magnetic circuit is lowered, and the magnetic attraction force between the object side configuration and the image plane side configuration of the magnetic circuit is also reduced. Therefore, it is not necessary to support the metal columns 305 as in the present exemplary embodiment, and the configuration can be simplified by incorporating the function of the columns 305 in the column holders 303h and integrating the column holders 303h in the base plate 303.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-165388, filed Sep. 4, 2018, which is hereby incorporated by reference herein in its entirety.

What is claimed is:

1. A lens apparatus comprising:
an imaging optical system including a plurality of lenses;
a movable member that holds at least one lens among the plurality of lenses and is movable in a direction including a component perpendicular to an optical axis of the imaging optical system;
a coil that is provided on the movable member to drive the movable member in the direction;
a shield member that covers at least a portion of the coil viewed in an optical axis direction from an image plane side, covers at least a portion of the coil viewed in a first direction perpendicular to the optical axis from one side of the movable member, and covers at least a portion of the coil viewed in the first direction from the other side of the movable member,
wherein, when the coil drives the movable member, the coil is configured to move with the movable member in the direction including the component perpendicular to the optical axis of the imaging optical system.

2. The lens apparatus according to claim 1, wherein the shield member includes a non-magnetic conductive material.

3. The lens apparatus according to claim 1, further comprising:
a fixed member of which movement in the direction is restricted; and
a first magnet that is provided on the fixed member to drive the movable member in the direction.

4. The lens apparatus according to claim 3, further comprising:
a second magnet that is provided on the image plane side with respect to the coil,
wherein the first magnet is provided on an object side with respect to the coil.

5. The lens apparatus according to claim 4, wherein the shield member covers at least a portion of the second magnet viewed in the optical axis direction from the image plane side, and covers at least a portion of the second magnet viewed in the first direction.

6. The lens apparatus according to claim 4, further comprising:
a first yoke that fixes the first magnet;
a second yoke that fixes the second magnet; and
a support unit that forms an air gap between the first yoke and the second yoke in the optical axis direction.

7. The lens apparatus according to claim 6, wherein a portion of the support unit is disposed in the shield member.

8. The lens apparatus according to claim 6, wherein a portion of the support unit passes through a hole portion provided in the fixed member.

9. The lens apparatus according to claim 1, further comprising a driving unit that pulse drives the coil in a pulse width modulation manner.

10. The lens apparatus according to claim 1, wherein the lens apparatus is detachably mountable to a camera body having an image sensor.

11. A camera system comprising:
   the lens apparatus according to claim 1, and
   an image sensor that receives light from the lens apparatus.

12. The lens apparatus according to claim 3,
   wherein the coil and the first magnet are provided relative to each other in a direction along the optical axis.

* * * * *